United States Patent Office 3,729,540
Patented Apr. 24, 1973

3,729,540
PURIFICATION OF TITANIUM TETRACHLORIDE FROM CONCOMITANT IMPURITIES
Vitaly Grigorievich Brudz, Abelmanovskaya ulitsa 7, kv. 94; Nikolai Nikolaevich Pronyakin, Pervomaiskaya ulitsa 74, kv. 64; Grigory Zakharovich Bljum, ulitsa Kominterna 32/5, kv. 23; Sarrya Isaakovna Khainson, Graivoronovskaya ulitsa 10, korpus 1, kv. 28; Gennady Georgievich Vinogradov, ulitsa Izmailovsky bulvar 58/13, kv. 16; and Muza Konstantinova Tuganova, ulitsa Boitsovaya 21, korpus 1, kv. 112, all of Moscow, U.S.S.R.; and Julia Vladimirovna Vasilieva, ulitsa Komsomolskaya 5, kv. 49, Reutov, U.S.S.R.
No Drawing. Filed July 28, 1971, Ser. No. 166,987
Int. Cl. C01g 23/02; B01d 3/34
U.S. Cl. 423—76                                    1 Claim

ABSTRACT OF THE DISCLOSURE

A method for the purification of technical titanium tetrachloride from concomitant impurities, which includes introducing dichloramide of benzene sulphonic acid into the starting technical product in an amount not exceeding 0.5 g. per lit. of said starting product at a temperature of from 40° C. to a B.P. of said starting technical product. The product to be purified is treated with metallic copper used in an amount of at least 50 g. per lit. of said starting product at the same temperature, with subsequent separation of a precipitate which is thus formed and rectification of the product. The method according to the invention enables the production of extra-high-purity titanium tetrachloride.

---

The present invention relates to methods for the purification of technical titanium tetrachloride from concomitant impurities.

The purified product may be used in modern technology, especially in quantum electronics, semiconductor techniques and optics.

Known in the art are methods for the purification of technical titanium tetrachloride from concomitant impurities, for instance, by treating the starting product with metallic copper with subsequent separation of a precipitate which is thus formed and rectification of the product.

Disadvantages of the prior-art methods reside in low degree of purification of the starting product, which does not permit the use of purified titanium tetrachloride in such fields of modern technology as quantum electronics, semiconductors and optics.

It is an object of the present invention to provide a method for the purification which will permit the production of extra-high-purity titanium tetrachloride.

In accordance with this and other objects, the present invention includes the introduction of dichloramide of benzene sulphonic acid into the starting technical product (titanium tetrachloride) in an amount not exceeding 0.5 g. per lit. of the starting product at a temperature of from 40° C. to the B.P. of the starting product. The product being purified is then treated with metallic copper used in an amount of at least 50 g. per lit. of the starting product at the same temperature, with subsequent separation of a precipitate which is thus formed, and rectification of the product.

During the treatment with dichloramide of benzene sulphonic acid a number of impurities (mainly volatile impurities) are being bound into difficultly volatile complex compounds which will remain in the still together with high-boiling impurities. This fact enables the rectification to be carried out continuously.

The method for the purification of technical titanium tetrachloride according to the present invention makes it possible to obtain an extra-high-purity product containing less than $1 \cdot 10^{-6}\%$ of each of impurities, such as iron, heavy metals, alkali and alkali-earth metals, arsenic, phosphorus, vanadium (with a content of said impurities in the starting technical product of $10^{-2}$ to $10^{-4}$ of each of the impurities).

The method for the purification of technical titanium tetrachloride according to the invention is carried out as follows:

Into the starting technical product containing impurities such as iron, heavy metals, alkali and alkali-earth metals, arsenium, phosphorus, vanadium, etc., is introduced dichloramide of benzene sulphonic acid in an amount not exceeding 0.5 g. per lit. of the starting product at a temperature of from 40° C. to a B.P. of the starting product. Then metallic copper is added at the same temperature in an amount of at least 50 g. per lit. of the starting product. A precipitate which is thus formed is then separated, e.g., by filtration, and the solution is rectified.

The invention will be better understood from the following examples illustrating the purification of technical titanium tetrachloride to obtain an extra-high-purity product.

EXAMPLE 1

1 l. of technical titanium tetrachloride containing $3 \cdot 10^{-4}\%$ of iron, $5-6 \cdot 10^{-4}\%$ of heavy metals, $2 \cdot 10^{-3}\%$ of alkali metals, $4-5 \cdot 10^{-4}\%$ of alkali-earth metals, $5 \cdot 10^{-3}\%$ of vanadium, $1 \cdot 10^{-4}\%$ of arsenic, $1 \cdot 10^{-4}\%$ of phosphorus was heated to 80° C. and then 0.2 g. of dichloramide of benzene sulphonic acid was introduced. Subsequently 60 g. of metallic copper was added at the above-mentioned temperature. A precipitate thus formed was filtered off, and the filtrate was then rectified.

Purified titanium tetrachloride contained less than $1 \cdot 10^{-6}\%$ of each of the impurities such as iron, heavy metal, alkali and alkali-earth metals, $5 \cdot 10^{-6}\%$ of vanadium, $1 \cdot 10^{-6}\%$ of arsenic, $1 \cdot 10^{-6}\%$ of phosphorus.

EXAMPLE 2

0.5 g. of dichloramide of benzene sulphonic acid was added at 100° C. into 1 l. of technical titanium tetrachloride (the content of impurities similar to that given in Example 1). Then 50 g. of metallic copper was added at the above mentioned temperature. A precipitate thus formed was filtered off, and the filtrate was then rectified.

Purified titanium tetrachloride contained less than $1 \cdot 10^{-6}\%$ of impurities such as iron, heavy metals, alkali and alkali-earth metals, $7 \cdot 10^{-6}\%$ of vanadium, $3 \cdot 10^{-7}\%$ of arsenic and $3 \cdot 10^{-7}\%$ of phosphorus.

EXAMPLE 3

0.3 g. of dichloramine of benzene sulphonic acid was added into 1 l. of technical titanium tetrachloride at 40° C. Then 70 g. of metallic copper was added at the above-mentioned temperature. A precipitate thus formed was filtered off, and the filtrate was then rectified.

The purified product contained less than $1 \cdot 10^{-6}\%$ of each of the impurities such as iron, heavy metals, alkali and alkali-earth metals, $3-5 \cdot 10^{-6}\%$ of vanadium, $5 \cdot 10^{-7}\%$ of arsenic and $5 \cdot 10^{-7}\%$ of phosphorus.

EXAMPLE 4

0.5 g. of dichloramide of benzene sulphonic acid was added into 1 l. of technical titanium tetrachloride at the B.P. of the starting technical product (136° C.). The process was performed with a reflux condenser. Then 70 g. of metallic copper was added at the above-mentioned temperature. A precipitate thus formed was then filtered off, and the filtrate was rectified.

Purified titanium tetrachloride contained less than $1 \cdot 10^{-6}\%$ of the impurities such as iron, heavy metal, alkali and alkali earth metals, $3 \cdot 10^{-6}\%$ of vanadium, $3 \cdot 10^{-7}\%$ or arsenic and $3 \cdot 10^{-7}\%$ of phosphorus.

We claim:
1. A method for the purification of technical titanium tetrachloride from concomitant impurities, which comprises introducing dichloramide of benzene sulphonic acid into the starting product in an amount not exceeding 0.5 g. per lit. of said starting product at a temperature of from 40° C. to the boiling point of said starting technical product, treating the product being purified with metallic copper used in an amount of at least 50 g. per lit. of said starting product at the same temperature to obtain a precipitate, separating said precipitate and rectifying the product.

References Cited

UNITED STATES PATENTS

| | | | |
|---|---|---|---|
| 2,592,021 | 4/1952 | Frey et al. | 423—76 |
| 2,725,350 | 11/1955 | Levy | 203—29 |
| 2,915,364 | 12/1959 | Clabaugh et al. | 423—76 |

EDWARD STERN, Primary Examiner

U.S. Cl. X.R.

423—77, 412; 203—29